United States Patent [19]

Loutfy et al.

[11] 4,265,716
[45] May 5, 1981

[54] METHOD OF WINNING ALUMINUM METAL FROM ALUMINOUS ORE

[75] Inventors: Raouf O. Loutfy; Rudolf Keller, both of Naperville; Neng-Ping Yao, Clarendon Hills, all of Ill.

[73] Assignee: The United States of America as represented by the United States Department of Energy, Washington, D.C.

[21] Appl. No.: 48,332

[22] Filed: Jun. 14, 1979

[51] Int. Cl.³ .................... C22B 21/02; C25C 3/06
[52] U.S. Cl. .................................. 204/67; 75/68 A; 75/68 R
[58] Field of Search ............... 204/67; 75/68 R, 68 A

[56] References Cited

U.S. PATENT DOCUMENTS

| 1,941,610 | 1/1934 | Macready | 204/67 |
| 2,400,000 | 5/1946 | Gardner | 75/68 A |
| 2,843,475 | 7/1958 | Weiss | 75/68 A |

FOREIGN PATENT DOCUMENTS 484014 4/1938 United Kingdom ............... 204/67

Primary Examiner—Howard S. Williams
Attorney, Agent, or Firm—Hugh W. Glenn; Frank H. Jackson; James E. Denny

[57] ABSTRACT

Aluminous ore such as bauxite containing alumina is blended with coke or other suitable form of carbon and reacted with sulfur gas at an elevated temperature. For handling, the ore and coke can be extruded into conveniently sized pellets. The reaction with sulfur gas produces molten aluminum sulfide which is separated from residual solid reactants and impurities. The aluminum sulfide is further increased in temperature to cause its decomposition or sublimation, yielding aluminum subsulfide liquid (AlS) and sulfur gas that is recycled. The aluminum monosulfide is then cooled to below its disproportionation temperature to again form molten aluminum sulfide and aluminum metal. A liquid-liquid or liquid-solid separation, depending on the separation temperature, provides product aluminum and aluminum sulfide for recycle to the disproportionation step.

10 Claims, 2 Drawing Figures

METHOD OF WINNING ALUMINUM METAL FROM ALUMINOUS ORE

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to processes for winning aluminum metal from aluminous ore. It particularly concerns nonelectrolytic methods for recovering aluminum, thereby reducing the levels of energy consumption.

The Bayer-Hall process has been used for the recovery of aluminum from ore for well over half a century. It is at present the only process commercially used in the United States to produce aluminum from bauxite. In the first step of the Bayer process, finely ground bauxite is dissolved in a mixture of sodium aluminate ($NaAlO_2$) and free caustic at elevated temperature and pressure. The other materials present in the bauxite, namely hematite ($Fe_2O_3$), titania ($TiO_2$) and silica ($SiO_2$) are insoluble. These impurities are removed from the aluminate liquor by thickening and filtration and then discarded.

The aluminum-bearing liquor is diluted and then cooled before being sent to large precipitation tanks where alumina (as trihydrate) precipitates out of solution. The solids are washed and then calcined to produce the alumina feed for the aluminum smelter. The spent liquor is concentrated by evaporation and recycled to the bauxite dissolution.

Reduction of alumina to aluminum is accomplished by the Hall electrolytic process. Alumina is continuously dissolved in a molten cryolite (typically a mixture of fluorides of sodium, aluminum and calcium) in an electrolytic cell where aluminum is produced at the cathode and oxygen-containing gases at the anode. The aluminum product, which collects on the bottom of the cells, is periodically removed and cast into ingots.

The Bayer-Hall process and various other electrolytic processes require relatively high expenditures of energy. At present, the aluminum industry uses about 4% of the nation's total electrical energy, thus establishing considerable incentive for more energy efficient means of producing aluminum.

One other process under active consideration by the aluminum industry involves the conversion of alumina to a material such as aluminum chloride ($AlCl_3$) followed by the electrolysis. This chloride process starts with alumina from the Bayer process. The alumina is first impregnated with carbon from cracking of heavy fuel oil in a two-stage fluid bed. The carbon-impregnated alumina is then chlorinated to produce volatile aluminum chloride in a fluid bed reactor at about 1300° F. The fluid-bed off-gases are cooled to condense out impurities. A final condensation, at about 150° F., removes aluminum chloride. The aluminum chloride is then fed to electrolytic cells containing a mixture of chlorides of aluminum, sodium and lithium operating at about 1290° F. Inert carbon anodes and cathodes are used to produce aluminum at the cathode and chlorine at the anode. The chlorine is recycled to the chlorination step. The molten aluminum is withdrawn from the cells and cast into ingots.

Even though the electrolytic decomposition of aluminum chloride requires somewhat less energy expenditure than the traditional alumina electrolysis, the preliminary process steps of purification and chlorination of alumina offset these economies to a large extent.

PRIOR ART STATEMENT

The following patents relate to but do not disclose or teach the claimed subject matter of the present invention.

U.S. Pat. No. 3,421,852 to Perieres et al. discloses the treatment of aluminous ore with carbon in the presence of sulfur at elevated temperatures to produce purified aluminum oxide. As explained in column 2, lines 17-27, carbon and sulfur are added in amounts to convert the impurities, e.g. iron, silicon, titanium, to their corresponding sulfides. No mention is made of the production of molten aluminum sulfide.

U.S. Pat. No. 2,843,475 to Weiss discloses the treatment of an alumina-aluminum sulfide mixture with carbon at elevated temperatures to produce a reaction gas including $Al_2S$. The $Al_2S$ is disproportionated to form molten aluminum and solid aluminum sulfide. This reference does not teach the reaction of alumina with sulfur gas to provide $Al_2S_3$, the decomposition of $Al_2S_3$ at elevated temperatures to form AlS and sulfur gas for recycle or the direct formation of AlS from alumina.

U.S. Pat. No. 1,816,842 to Haglund discloses the reaction of alumina in bauxite with such as FeS and carbon to produce $Al_2S_3$. The process is directed to the treatment of iron oxide impurities by conversion to sulfides of iron. No discussion is included regarding processing of the aluminum sulfide to provide aluminum metal.

SUMMARY OF THE INVENTION

Therefore, in view of the above, it is an object of the present invention to provide an improved process for the winning of aluminum metal from aluminous ore.

It is a further object to provide an energy efficient metallurgical process for the recovery of aluminum from aluminous ore.

It is also an object to provide a method of winning aluminum metal from ore in which metal impurities are removed as sulfides or oxides in the course of the process.

In accordance with the present invention, a process for winning aluminum metal from aluminous ore is presented in which the aluminous ore is contacted with a reducing agent including carbon and with a sulfur-containing gas to form molten aluminum sulfide and carbon monoxide gas. The molten aluminum sulfide is separated from solid impurities and residual reactants, then heated to a temperature sufficient to cause its decomposition to liquid aluminum monosulfide (AlS) and sulfur gas. The aluminum monosulfide is cooled to a temperature at which it disproportionates to aluminum sulfide and molten aluminum metal which is separated as product. The aluminum sulfide is recycled to the high-temperature decomposition step.

In an alternate procedure alumina is reacted with carbon and a sulfur-containing gas at a temperature sufficient to directly form aluminum monosulfide liquid and carbon monoxide gas. The aluminum monosulfide is separated and cooled to a temperature at which it disproportionates to aluminum sulfide and molten aluminum metal. The aluminum sulfide is electrolytically decomposed to aluminum metal and sulfur gas. The aluminum metal formed in the disproportionation and in the electrolysis steps is recovered as product.

DESCRIPTION OF THE DRAWING

The present invention is illustrated in the accompanying drawings wherein.

DESCRIPTION OF THE PREFERRED EMBODIMENT

In one manner of winning aluminum metal from aluminous ore, the ore after preliminary processing is blended in convenient form such as in pellets with coke or other suitable particulate carbon. This feed material is reacted with a sulfur-containing gas in accordance with the following reaction at a temperature of about 1300–1500 K.

$$Al_2O_3 + 3C + 3S \xrightarrow{\Delta} Al_2S_3 + 3CO.$$

Other minerals such as hematite and titania are also reacted with sulfur to form solid sulfides. Silica remains unreacted as a solid oxide material. There impurities can be removed in a subsequent phase separation.

The sulfur-containing gas may include sulfur in one or more of several forms including $S_2$, $S_6$ or $CS_2$. Where the gas includes carbon as in carbon disulfide it can serve in place of at least a portion of the carbon otherwise introduced as coke or other solids. The gas phase from the above sulfuration reaction also may include some of these sulfur-containing gases as excess reactants. By-products such as COS may appear in the reactor gases and be separated from carbon monoxide along with the other sulfur-containing gases by condensation or disproportionation in the case of COS.

The resulting molten aluminum sulfide ($Al_2S_3$) is heated to an elevated temperature of about 1600 K to 1900 K and held there for a sufficient time, e.g. about 15–60 minutes to cause its decomposition to molten AlS and sulfur gas in accordance with the reaction $$Al_2S_3 \rightarrow 2AlS + S.$$

Since the aluminum sulfide does not exist at temperatures above this range, substantially 100% conversion can be expected.

The molten aluminum monosulfide is then cooled to a temperature sufficient to cause its disproportionation to aluminum sulfide and molten aluminum metal. The disproportionation occurs as follows:

$$3AlS \rightarrow Al_2S_3 + Al.$$

The disproportionation is performed in the temperature range of 1200 K to 1370 K. The upper limit of this range is determined by the equilibrium of the reaction, generally with AlS being the stable form above 1370 K and $Al_2S_3$ being stable below 1370 K. The molten aluminum metal is recovered in a liquid-solid or liquid-liquid separation depending on temperature and melting point of the aluminum sulfide rich phase. The aluminum sulfide is recycled to the decomposition reaction for more complete aluminum recovery.

Figure 1:
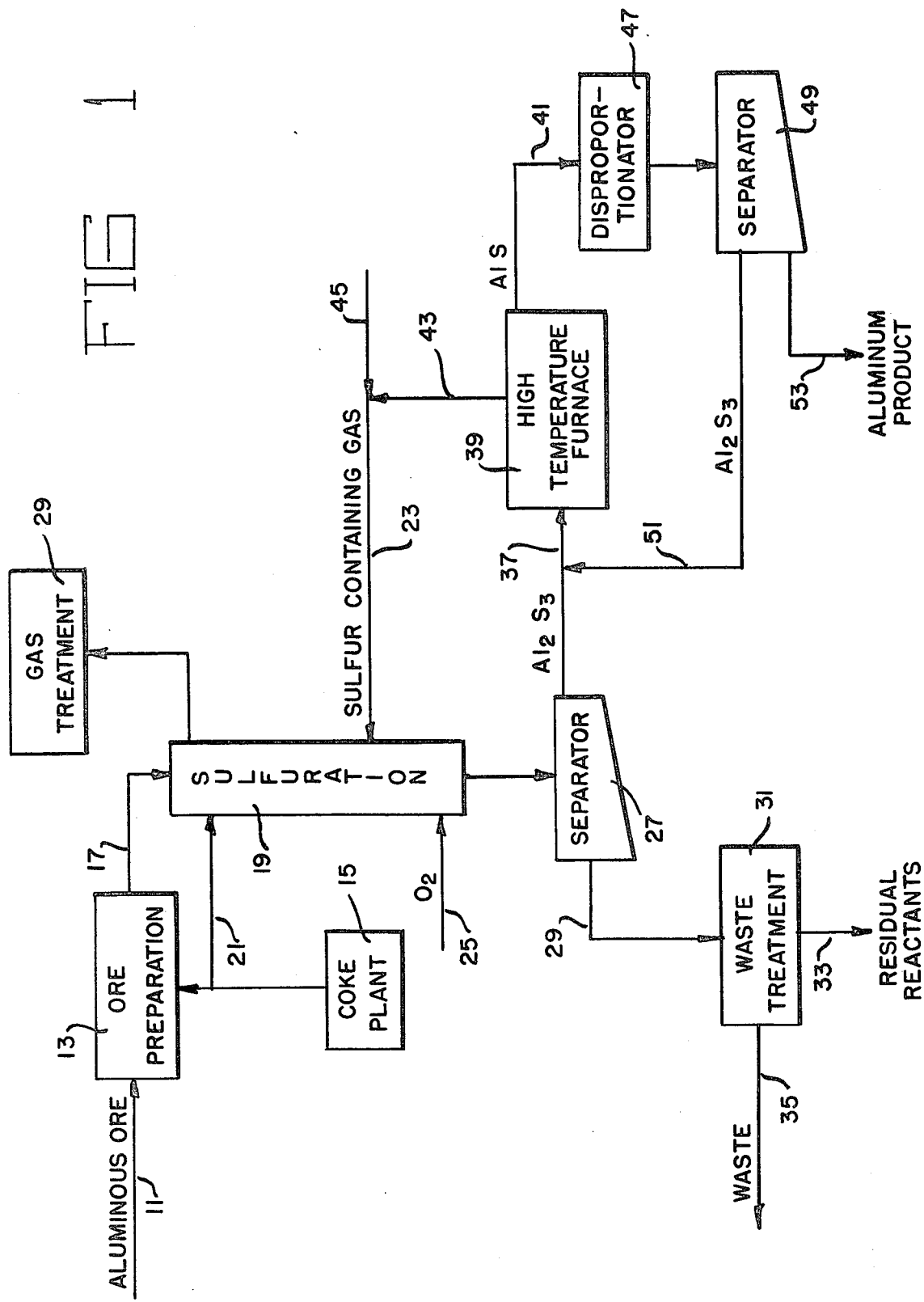
FIG. 1 is a flow diagram of an aluminum winning process.

In FIG. 1, one particular aluminum winning process is illustrated in more detail. Aluminous ore 11 containing alumina can be prepared by blending with particulate carbon and pressed into pellets or extrudates for convenient handling within a suitable ore preparation operation 13. Carbon for blending with the ore can be provided from a conventional coke plant 15 or other suitable source.

In some instances, such as where the ore contains a high level of impurities, the ore preparation can also include procedures similar to those in the conventional Bayer process in which iron, titanium, silicon and other metal impurities are removed. As an example, these impurities are removed from bauxite feed by dissolving the alumina in a molten caustic mixture of sodium aluminate and sodium hydroxide at about 400–500 K and 150–200 psig. The impurities including $Fe_2O_3$, $TiO_2$ and $SiO_2$ remain as solids and are removed by filtration. The treated feed ore 17 is transferred to a sulfuration reactor 19 where it is mixed with additional coke 21 to insure adequate reductant as well as to provide fuel for producing the required elevated temperature.

Within reactor 19, alumina is converted to aluminum sulfide ($Al_2S_3$) while carbon is oxidized to form carbon monoxide. Sulfur-containing gas 23 needed to carry out this reaction and air or other oxygen source 25 for burning the excess coke are illustrated as entering at the lower section of the reactor 19. The results of these reactions provide sufficient heat to elevate the temperature to a sufficient sulfuration temperature above the melting point of aluminum sulfide, e.g. from about 1370 K to about 1500 K. Somewhat lower temperatures down to about 1250 K can be obtained in liquid phase it up to about 10 mol % BaS is added to the alumina ore to reduce the melting point of $Al_2S_3$. Such an addition can be advantageously used to facilitate the subsequent liquid-solid separation 27.

The carbon monoxide, combustion gases and unreacted sulfur gas can be suitably processed in a known manner illustrated at gas treatment 29. In such a gas treatment process, sulfur-containing gases can be removed by condensation and recycled to the reactor. The carbon monoxide can be recovered for use as fuel.

The sulfuration reactor 19 can be a conventional furnace that permits the combustion of coke to produce the required reaction temperatures of 1300 to 1500 K for the sulfuration of alumina. For example, the reaction can be performed in batch kilns or ladles of ceramic material.

Separator 27 can include one or more suitable units for performing solid-liquid separations including decanting or flotation techniques that take into account density differences. Solid material 29 removed from separator 25 can include recoverable alumina and coke as well as high concentrations of sulfides of iron and titanium along with silicon oxide. Waste treatment operation 31 can take into account the recovery of residual reactants 33 as well as preparing the waste 35 for disposal. In such a waste treatment operation, flotation or other known techniques can be used.

The molten aluminum sulfide 37 from the separator 27 is passed to an electric arc furnace 39 or other suitable means for obtaining high temperatures of 1600 to 1900 K for a residence time of, for example, 15–60 min. At these temperatures, the aluminum sulfide is decomposed, forming molten aluminum monosulfide 41 and sulfur gas 43. The sulfur gas 43 can be recycled advantageously to the sulfuration reactor 19. Additional makeup sulfur or other sulfur-containing gases 45 will be required to offset losses from the process such as that contained within the sulfurated waste 35.

The molten AlS at 41 subsequently is reduced in temperature to a sufficiently low level, e.g. 1100 K to 1370 K, to disproportionate and form aluminum sulfide and molten aluminum metal. By including BaS molten aluminum sulfide can be present in the upper portion of this temperature range. The disproportionation may be accomplished in a separate unit 47 or merely by reducing the temperature within furnace 39 in batch-type processes. The molten aluminum metal is recovered as product 53 within a suitable liquid-liquid or solid-liquid separator 49, such as a settling or liquid decant vessel. The aluminum sulfide 51 can be recycled as added feed into furnace 39. The handling of the recycled aluminum sulfide 51 is facilitated if it is in the liquid state.

Figure 2:
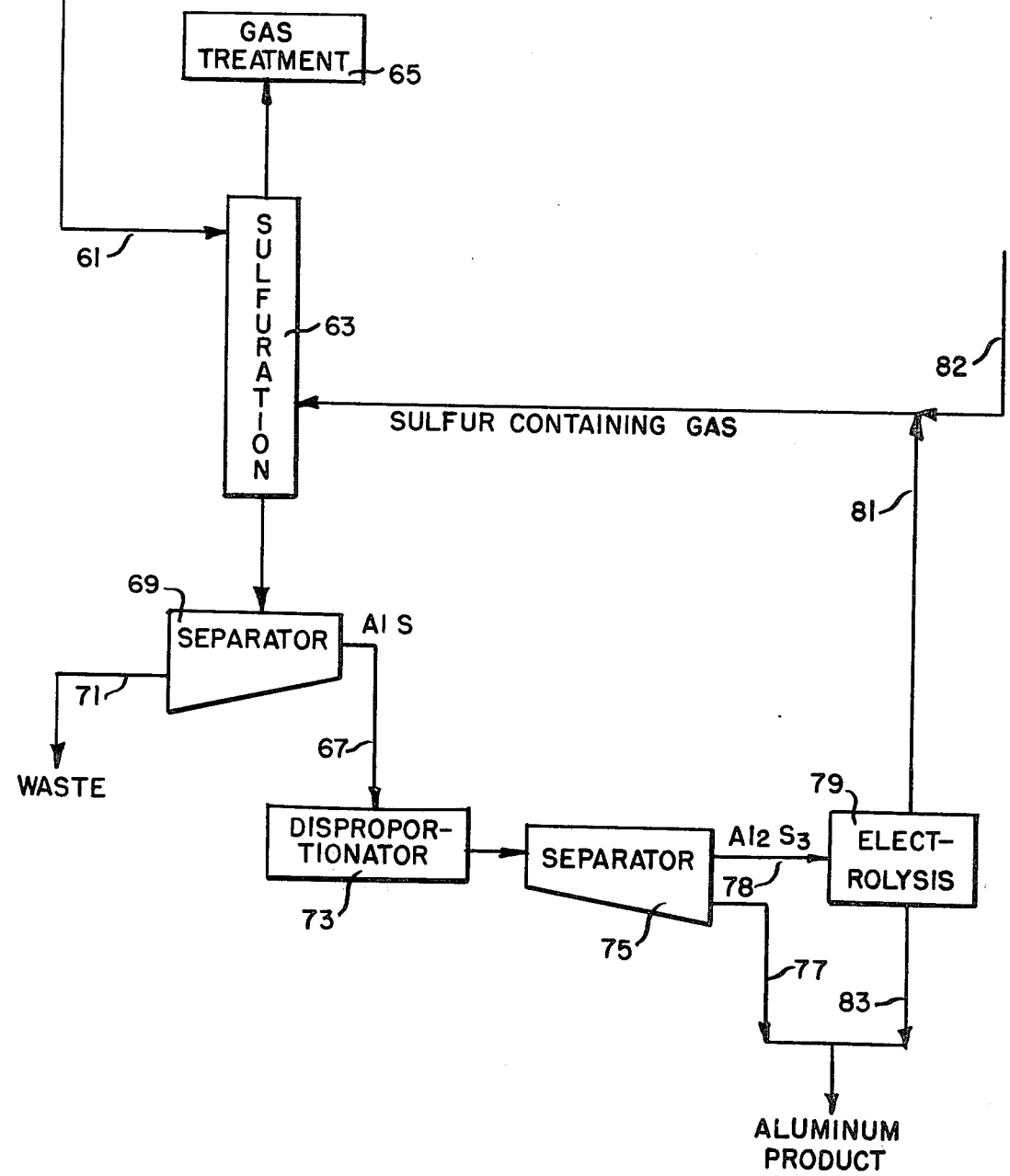
FIG. 2 is a flow diagram of an alternate procedure in the aluminum winning process of FIG. 1.

In FIG. 2, an alternative to the present process that combines metallurgical with electrolytic process steps is presented. Aluminous ore 61 after treatment and combination with carbon is fed into a sulfuration reactor 63 where an increased temperature of about 1500–1600 K brings about the following reaction

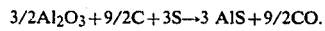

$$3/2 Al_2O_3 + 9/2 C + 3S \rightarrow 3 \, AlS + 9/2 \, CO.$$

The gases are separated and treated in process unit 65 as described above. Molten aluminum monosulfide (AlS) 67 is separated at 69 from solid wastes 71 in a liquid-solid type separation at temperatures above 1370 K.

The AlS is recovered and passed to a disproportionation vessel 73 where its temperature is reduced to a sufficient level, e.g. 1100 K to 1370 K, to result in the following disproportionation

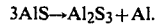

$$3 AlS \rightarrow Al_2S_3 + Al.$$

All or a part of the molten aluminum 77 may be recovered in a phase separation 75 and the aluminum sulfide 78 (solid at these temperatures) passed to an electrolysis unit 79.

The $Al_2S_3$ can be electrolytically decomposed in such as molten cryolite at about 1000–1200 K to produce sulfur gas 81 and molten aluminum 83. The sulfur gas 81 is combined with any required makeup sulfur 82 and recycled to the sulfuration reactor 63. Any elemental aluminum on or within the aluminum sulfide feed to this electrolytic step also will be recovered. As a variation to this process, the separate phase separation at 75 may be eliminated and all of the elemental aluminum recovered in vessels used for the electrolytic decomposition. It is to be understood that even though the aluminum product is separated in the electrolysis equipment, electrical energy need not be provided to decompose that portion of the aluminum previously produced by disproportionation of AlS. This combined metallurgical-electrolytic process gives the potential of producing one-third of the aluminum product by disproportionation and two-thirds by electrolytic decomposition. However, the electric energy required to electrolytically decompose $Al_2S_3$ is less than that required for either $Al_2O_3$ or for $AlCl_3$. Also the high temperatures that are produced in the electric arc furnace in the FIG. 1 embodiment are somewhat moderated by this alternate procedure.

The presently described metallurgical and combined processes for winning aluminum from aluminous ore are compared below in Table I with the conventional Bayer-Hall process and with a typical process employing the electrolytic decomposition of aluminum chloride. Both of these electrolytic processes are described in the Background of the Invention.

The FIG. 1 metallurgical process is illustrated in Table I with both bauxite feed and with an alumina feed that is previously treated by the Bayer process.

TABLE I

| Process | Fuel (Actual) Million BTU/ton Al | Electricity kwh/ton Al | Total Energy Million BTU/ton Al |
|---|---|---|---|
| Metallurgical | | | |
| Bauxite Feed | 55 | 5780 | 115 |
| Alumina Feed | 55 | 5660 | 114 |
| Combined Metallurgical-Electrolytic | | | |
| Alumina Feed Electrolytic | 65 | 5880 | 127 |
| Bayer-Hall | 45 | 12,275 | 170–240 |
| Chloride | 47 | 10,775 | 150–160 |

An additional breakdown of the energy uses for the two metallurgical processes is given below in Table II.

TABLE II

| | Bauxite Feed | | Bayer Alumina Feed | |
|---|---|---|---|---|
| Process Section | Fuel $10^6$ BTU/ton | Power kwh/ton | Fuel $10^6$ BTU/ton | Power kwh/ton |
| 1a. Pelletize and Sinter | 4 | 165 | — | — |
| 1b. Bayer process | — | — | 22 | 305 |
| 2. Sulfuration Reactor & Waste Separation | 64 | 130 | 41 | 40 |
| 3. Electric Furnace | — | 5150 | — | 5150 |
| 4. Disproportionation & Al Separation | — | 50 | — | 50 |
| 5. Solid Waste Handling | — | 150 | — | 25 |
| 6. Gas Treatment & CO Recovery | (17) | 40 | (11) | 25 |
| 7. Coke Production | 3 | 70 | 2 | 40 |
| 8. Offsite | 1 | 25 | 1 | 25 |
| Total Plant | 55 | 5780 | 55 | 5660 |

It is therefore seen from the above that the present invention provides an improved process for the winning of aluminum from aluminous ore by metallurgical and combined metallurgical-electrolytic techniques at a substantial saving in energy consumption over presently employed processes. It is also estimated that the capital cost for such a process is about the same or slightly less than that of the conventional Bayer-Hall process.

It is to be understood that, although the present invention has been described in terms of particular materials and process steps, various changes and modifications can be made in accordance with known techniques and materials by one skilled in the art within the scope of the following claims.

The embodiments of the invention in which an exclusive property or privilege is claimed are defined as follows:

1. A method of winning aluminum metal from aluminous ore containing alumina comprising:
   contacting said ore with a sulfur-containing gas and with carbon at a temperature of 1500–1600 K to produce aluminum monosulfide liquid and carbon monoxide gas;
   separating in a solid-liquid type separation said aluminum monosulfide from a solid phase containing impurities and residual reactants;

cooling said aluminum monosulfide to a temperature of 1100–1370 K to cause it to disproportionate to aluminum sulfide and molten aluminum metal;

electrolytically decomposing said aluminum sulfide to molten aluminum metal and sulfur gas; and separating said molten aluminum metal as product.

2. A method of winning aluminum metal from aluminous ore containing alumina comprising:

contacting said ore with a sulfur-containing gas and with carbon to react alumina, carbon and sulfur at a temperature of 1300–1500 K to yield aluminum sulfide ($Al_2S_3$) and carbon monoxide gas;

including sufficient BaS in the reacted materials to ensure a molten phase containing aluminum sulfide;

separating said aluminum sulfide in molten phase from a solid phase containing impurities and residual reactants and from a gaseous phase containing carbon monoxide and residual sulfur;

heating said aluminum sulfide in molten phase to a first temperature sufficient to cause it to decompose to aluminum monosulfide (AlS) liquid and sulfur gas;

withdrawing said sulfur gas for recycle into contact with said ore;

subsequently cooling said molten aluminum monosulfide to a second temperature sufficiently low to cause it to disproportionate to aluminum sulfide and molten aluminum metal; and separating said molten aluminum metal product from said aluminum sulfide.

3. The method of claim 2 wherein said aluminous ore is blended with particulate carbon prior to contacting with sulfur-containing gas.

4. The method of claim 2 wherein said first temperature is about 1600 K to 1900 K and said second temperature is about 1100 K to 1370 K.

5. The method of claim 2 wherein said aluminum sulfide separated from said molten aluminum is recycled and combined with said molten aluminum sulfide prior to heating to said first temperature.

6. The method of claim 2 wherein said sulfur-containing gas is selected from the group consisting of sulfur gas and carbon disulfide gas.

7. The method of claim 2 wherein said aluminous ore is bauxite.

8. The method of claim 2 wherein said aluminous ore is blended with said carbon comprising coke and pressed into pellets prior to reacting with sulfur-containing gas.

9. The method of claim 2 wherein said aluminous ore is bauxite and is purified in accordance with the Bayer process prior to blending with carbon.

10. The method of claim 2 wherein said BaS is added in an amount up to about 10 mole percent BaS.

* * * * *